(12) United States Patent
Dasika et al.

(10) Patent No.: US 9,582,419 B2
(45) Date of Patent: Feb. 28, 2017

(54) DATA PROCESSING DEVICE AND METHOD FOR INTERLEAVED STORAGE OF DATA ELEMENTS

(71) Applicant: ARM LIMITED, Cambridge (GB)

(72) Inventors: Ganesh Suryanarayan Dasika, Austin, TX (US); Rune Holm, Cambridge (GB); Stephen John Hill, Cambridge (GB)

(73) Assignee: ARM Limited, Cambridge (GB)

( * ) Notice: Subject to any disclaimer, the term of this patent is extended or adjusted under 35 U.S.C. 154(b) by 175 days.

(21) Appl. No.: 14/063,161

(22) Filed: Oct. 25, 2013

(65) Prior Publication Data

US 2015/0121019 A1 Apr. 30, 2015

(51) Int. Cl.
*G06F 12/06* (2006.01)
*G06F 9/00* (2006.01)

(52) U.S. Cl.
CPC .............. *G06F 12/0607* (2013.01); *G06F 9/00* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 5,867,724 A * | 2/1999 | McMahon | ....................... | 712/22 |
| 7,120,781 B1 | 10/2006 | Kolagotla et al. | | |
| 2004/0054877 A1 * | 3/2004 | Macy et al. | ................... | 712/221 |
| 2005/0044434 A1 * | 2/2005 | Kahle et al. | ................... | 713/320 |
| 2005/0125636 A1 | 6/2005 | Ford et al. | | |
| 2005/0125639 A1 * | 6/2005 | Symes et al. | ................. | 712/225 |
| 2005/0184994 A1 * | 8/2005 | Suzuoki et al. | ............... | 345/502 |
| 2009/0172358 A1 | 7/2009 | Sperber et al. | | |
| 2013/0232321 A1 * | 9/2013 | Hargil et al. | .................. | 712/208 |
| 2014/0208069 A1 * | 7/2014 | Wegener | ......................... | 712/22 |

OTHER PUBLICATIONS

"Arithmetic-logic Unit." High Definition: A-z Guide to Personal Technology. Boston: Houghton Mifflin, 2006. Credo Reference. Web. May 12, 2015.*

(Continued)

*Primary Examiner* — Brian Peugh
*Assistant Examiner* — Dustin Bone
(74) *Attorney, Agent, or Firm* — Nixon & Vanderhye P.C.

(57) ABSTRACT

A data processing device 100 comprises a plurality of storage circuits 130, 160, which store a plurality of data elements of the bits in an interleaved manner. Data processing device also comprises a consumer 110 with a number of lanes 120. The consumer is able to individually access each of the plurality of storage circuits 130, 160 in order to receive into the lanes 120 either a subset of the plurality of data elements or y bits of each of the plurality of data elements. The consumer 110 is also able to execute a common instruction of each of the plurality of lanes 120. The relationship of the bits is such that b is greater than y and is an integer multiple of y. Each of the plurality of storage circuits 130, 160 stores at most y bits of each of the data elements. Furthermore, each of the storage circuits 130, 160 stores at most y/b of the plurality of data elements. By carrying out the interleaving in this manner, the plurality of storage circuits 130, 160 comprise no more than b/y storage circuits.

15 Claims, 5 Drawing Sheets

(56) References Cited

OTHER PUBLICATIONS

Whitepaper "NVIDIA's Next Generation CUDA Compute Architecture: Fermi." V1.1. 2009. Retrieved from www.nvidia.com on Jun. 10, 2015.*
Quintana et al., "Adding a Vector Unit to a Superscaler Processor", (No Date), pp. 1-10.
Sasanka et al., "ALP: Efficient Support for all Levels of Parallelism for Complex Media Applications", *University of Illinois at Urbana-Campaign and Intel Corporation*, Mar. 2007, pp. 1-30.
UK Search Report issued Mar. 31, 2015 in GB 1417332.2, 3 pages.

* cited by examiner

DATA PROCESSING DEVICE AND METHOD FOR INTERLEAVED STORAGE OF DATA ELEMENTS

BACKGROUND

The present invention relates to the field of data processing. In particular, the present invention relates to the interleaved storage of data elements.

In a Single Instruction Multiple Data (SIMD) architecture, a data processing element (also referred to as a consumer) may execute a single instruction on several data elements at once. The data processing element acquires the data elements from storage circuits. Each data element is then inserted into a separate lane of the processing element and a single instruction can then execute on each of the lanes in parallel. Consequently one instruction is executed on many data elements at the same time, thereby providing data parallelisation.

The processing element may acquire the plurality of data elements from a plurality of general purpose registers which collectively form a SIMD register. In order that the processing element can access the bits that make up the data elements in parallel, it is necessary for each of the general purpose registers to be provided in a separate register bank. If two such registers were provided in the same register bank it would require two accesses to that register bank (or multiple access ports) in order to retrieve the bits stored therein. Since each access to a register bank takes time, latency of the processing element would be increased.

Often, the processing element is less wide than the SIMD register. That is, the processing element may hold fewer bits than the SIMD register is able to store. The processing element may therefore elect to either handle the data elements stored in the SIMD register in batches, or else may iteratively handle a subset of the bits of each of the data elements stored in the SIMD register. For example, the top 32 bits of every data element may be handled first, followed by the bottom 32 bits of every data element. The technique that is used by the processing element at any particular instant may depend on the operation being carried out and, in particular, which technique will be most efficient.

The registers making up the SIMD register may be accessed individually or in combination to acquire the necessary data for the processing element. It is therefore necessary to provide muxing logic between the banks of registers that that make up or provide the SIMD registers. However, each of the register banks and the muxing logic both consume space and consume power, which are disadvantageous.

SUMMARY

In accordance with one aspect there is provided a data processing device comprising: a plurality of storage circuits configured to store a plurality of data elements of b bits in an interleaved manner; and a consumer comprising a plurality of lanes, configured to be able to individually access each of said plurality of storage circuits, to receive into said plurality of lanes either a subset of said plurality of data elements or y bits of each of said plurality of data elements, and to execute a common instruction on each of said plurality of lanes, wherein b is greater than y and is an integer multiple of y; wherein each of said plurality of storage circuits is configured to store at most y bits of each of said data elements; wherein each of said plurality of storage circuits is configured to store at most y/b of said plurality of data elements; and wherein said plurality of storage circuits comprise no more than b/y storage circuits.

A consumer may access, in parallel, bits from the storage circuits in either of the following ways: In the first way, the consumer receives into a plurality of lanes a subset of the plurality of data elements. In the second way, the consumer receives a subset, y, of the bits of each of the plurality of data elements in storage circuits. As previously discussed, the consumer may change between these ways, depending on which is most efficient at a particular time. In either case, there are certain combinations of bits that make up the data elements, which the consumer does not access in parallel. Combinations of bits that the consumer does not access in parallel can be stored in the same storage circuit. Consequently, the number of storage circuits, and therefore the amount of circuitry and power requirements will be reduced, without requiring the consumer to make multiple accesses to the same storage circuit, which would increase latency.

This distribution of bits is achieved by interleaving. The interleaving is such that for data elements having a length of b bits, each of the storage circuits is configured to store at most y bits of each of the data elements and each storage circuit is configured to store at most y/b of the data elements. Hence, regardless of whether the consumer accesses bits according to the first way or second way, as previously discussed, the consumer can still access the required bits in parallel by accessing each of the storage circuits once and the number of storage circuits may be reduced to a maximum of b/y.

The plurality of storage circuits may be further configured to store a plurality of second data elements of c bits in an interleaved manner. Furthermore, the data processing device may comprise a second consumer configured to access in parallel a smaller number of bits than the first consumer, the second consumer comprising a plurality of second lanes and being configured to access a second subset of said plurality of storage circuits, to receive into said plurality of second lanes z bits of z/c of said plurality of second data elements from each storage circuit in the second subset, and to execute a common instruction on each of the plurality of second lanes The interleaving of bits is further advantageous in that the second consumer is able to retrieve only those bits that are required for the present operation. In particular, the second consumer is not forced to request more bits than can be handled at once. In addition, neither the first consumer nor the second consumer is required to make multiple accesses to any one storage circuit in order to acquire bits in parallel. This has the advantage that latency is not increased.

The second subset of storage circuits may consist of one of the plurality of storage circuits. That is, the second consumer may be configured to access any one of the storage circuits.

The second consumer may be, for example, a Floating Point Unit (FPU), which may be configured to perform a floating point operation on a plurality of data elements stored in the plurality of lanes.

The consumer may access 1024 bits in parallel and the second consumer may access 512 bits in parallel. That is, the consumer may have a width of 1024 bits and the second consumer may have a width of 512 bits. It will be appreciated that other widths may be possible. In particular, the width need not be a power of two, nor must the width of the second consumer necessarily be an exact factor of the consumer width. However, it may be advantageous for the widths of the consumer and the second consumer to be a multiple of the width of one of the elements of one of the storage circuits.

The consumer may be an integer Arithmetic Logic Unit (ALU). Such an integer ALU may be used to perform integer operations on multiple data elements stored in the lanes of the consumer, in parallel.

Each of the storage circuits may be configured to store a block of contiguous bits of each of the data elements. That is, each storage circuit may store blocks of bits, without any gaps between within each block. In other words, each data element may be thought of as having been separated into a number of blocks, with each block being allocated to one of the storage circuits.

The plurality of storage circuits may comprise no more than two storage circuits. For example, if the variable b is 64 and the variable y is 32. Of course, it will be appreciated by the skilled person that other numbers are possible for these variables, provided that the requirements mentioned in respect of the first aspect are met.

Each of the storage circuits may be configured to store exactly y bits of each of the data elements.

Each of the plurality of storage circuits is may be configured to store exactly y/b of the plurality of data elements.

In some embodiments, the storage circuits are register blocks. Each register block may comprise a set of general purpose registers. Other storage circuits suitable for storing data elements will be apparent to the skilled person.

In accordance with a second aspect of the invention there is provided a data storage method for storing a plurality of data elements of b bits in no more than a plurality of storage circuits in an interleaved manner to be accessed by a consumer, wherein said consumer comprises a plurality of lanes and receives into said plurality of lanes either a subset of said plurality of data elements or y bits of each of said plurality of data elements, said method comprising: each of said plurality of storage circuits storing at most y bits of each of said data elements; each of said plurality of storage circuits storing at most y/b of said plurality of data elements, wherein b is greater than y and is an integer multiple of y; and wherein said plurality of storage circuits comprise no more than b/y storage circuits.

In accordance with a third aspect of the invention there is provided a data processing device comprising: a plurality of storage circuit means for storing a plurality of data elements of b bits in an interleaved manner; and a consumer means for individually accessing each of said plurality of storage circuits, for receiving into a plurality of lanes either a subset of said plurality of data elements or y bits of each of said plurality of data elements, and for executing a common instruction on each of said plurality of lanes, wherein b is greater than y and is an integer multiple of y; wherein each of said plurality of storage means is configured to store at most y bits of each of said data elements; wherein each of said plurality of storage means is configured to store at most y/b of said plurality of data elements; and wherein said plurality of storage means comprise no more than b/y storage means.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
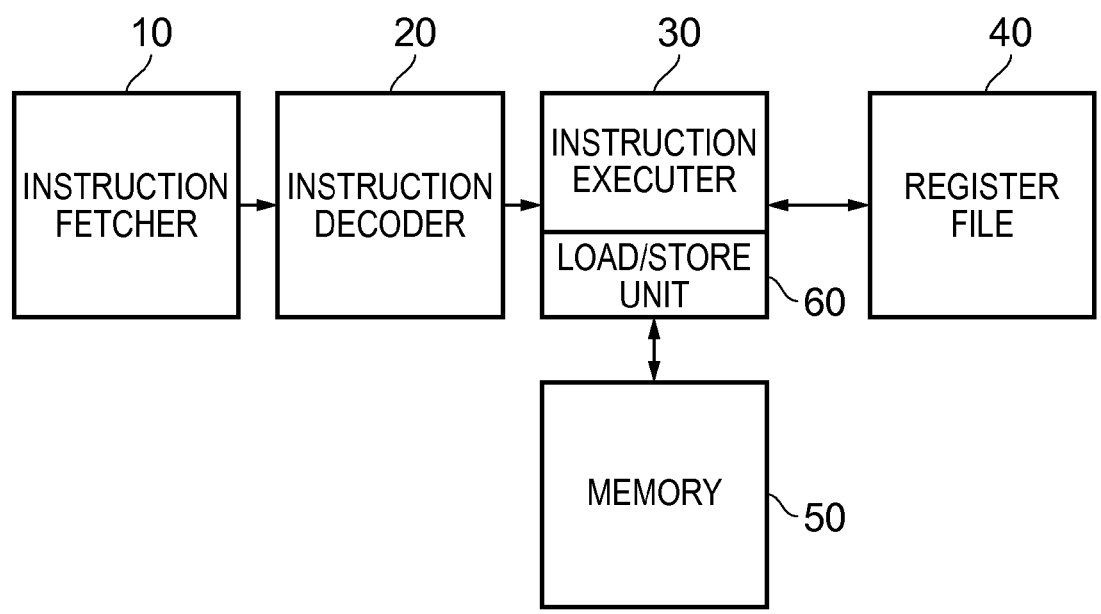
FIG. 1 shows a system comprising a data processing apparatus in accordance with one example embodiment.

FIG. 1 shows an example system comprising a data processing apparatus in accordance with one embodiment. In FIG. 1, an instruction fetcher 10 is configured to fetch instructions from memory. The fetched instruction is passed to an instruction decoder 20. The instruction decoder 20 determines the instruction that is to be executed and relevant control signals are produced and sent to the instruction execution circuitry 30. The instruction execution circuitry 30 responds to the control signals by performing a particular computation using, for example, ALUs, bits shifters, FPUs etc. That is, the instruction execution circuitry 30 may be responsible for manipulating data elements. A load/store unit 60 is provided at the instruction execution circuitry 30 for access to a memory device 50. Additionally, the instruction execution 30 may communicate with one or more storage circuits or register banks located in a register file 40. In particular, the instruction execution circuitry 30 may load/store data to the register banks in the register file 40.

Figure 2:
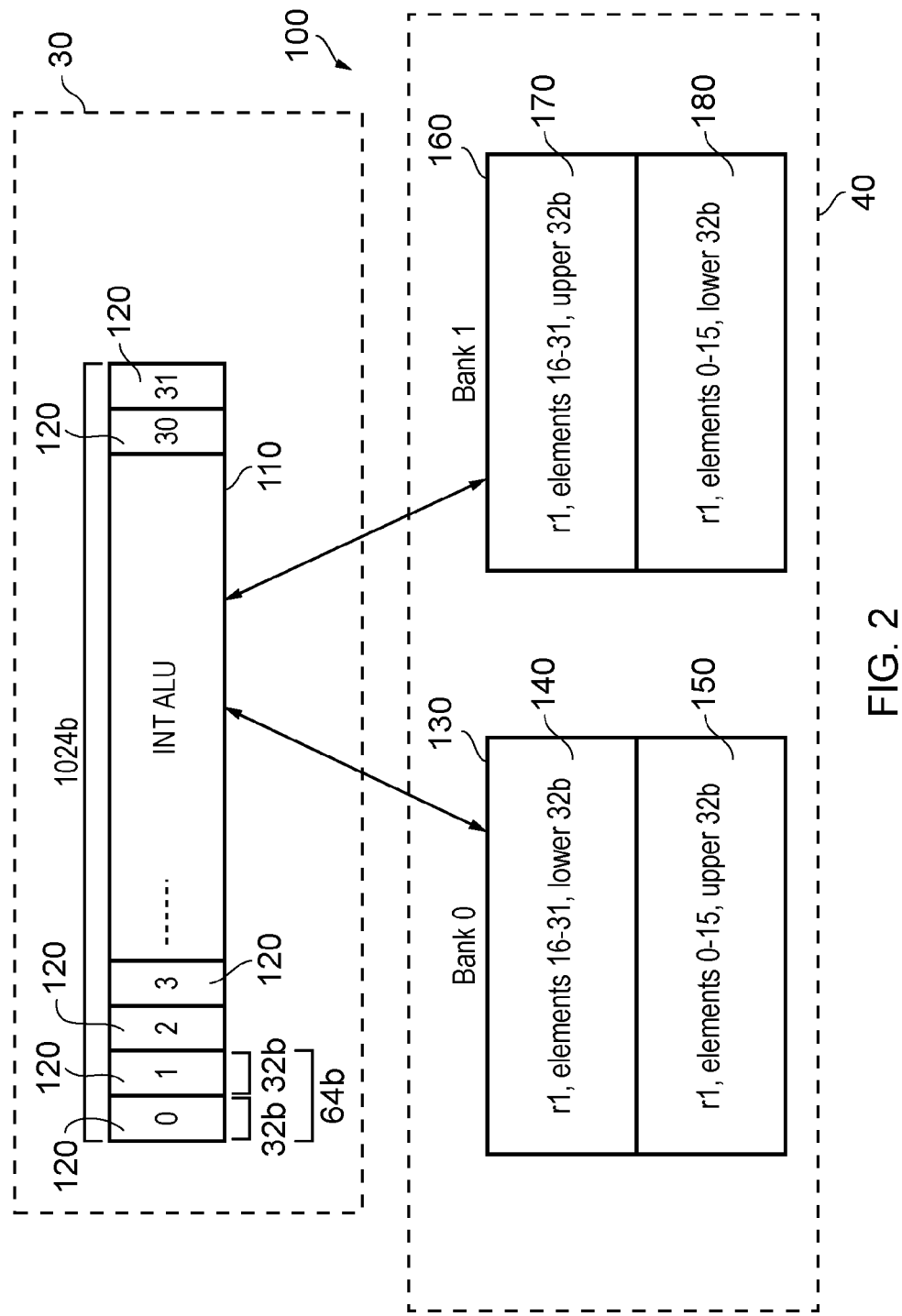
FIG. 2 shows instruction execution circuitry as the consumer configured to acquire data elements from a register file comprising the storage circuits.

FIG. 2 shows an example of data processing apparatus 100. The data processing apparatus 100 comprises an integer ALU 110, which acts as instruction execution circuitry 30. In this example, the integer ALU 110 has a width of 1024 bits, separated into lanes 120. Each of the lanes 120 is 32 bits in width, giving a total of 32 lanes numbered 0 to 31. In this example, an integer is considered to be a 64 bit value. Accordingly, two adjacent lanes may be combined in order to form a single lane that handles the entirety of an integer value. For example, as shown in FIG. 2, lanes zero and one, each of 32 bits, may be combined to form a single 64 bit lane. The register file 40 comprises two register banks 130, 160, which are examples of storage circuits. Each of the register banks comprises two registers. For example, bank zero comprises registers 140, 150 and bank one comprises registers 170, 180. Each register within each register bank has a width or size of 512 bits. Collectively, all four registers 140, 150, 170, 180 form a single SIMD register, which stores 32 data elements of 64 bits.

The interleaving of the bits of the data elements can be seen in FIG. 2. In particular, the register 140 contains the lower 32 bits of elements 16 to 31, the register 150 contains the upper 32 bits of elements 0 to 15, the register 170 contains the upper 32 bits of elements 16 to 31, and the register 180 contains the lower 32 bits of elements 0 to 15. Due to the bits of the data elements being interleaved in this manner it is possible for the integer ALU 110 to access:

all of the bits relating to a subset of the data elements in register file 40. For example, all 64 bits from elements 0 to 15 can be accessed by accessing the register 150 from bank zero 130 and the register 180 from bank one 160. Alternatively, all 64 bits from elements 16 to 31 can be accessed by accessing the register 140 from bank zero 130, and the register 170 from bank one 160.

a subset of the bits of each of the 32 elements stored in the register file 40. For example, the upper 32 bits from elements 0 to 32 may be accessed by accessing the register 150 from bank zero 130, and the register 170 from bank one 160. Alternatively, the lower 32 bits may be accessed for all 32 elements in the data file 40 by accessing the register 140 from bank zero 130, and the register 180 from bank one 160.

In either case, it can be seen that the integer ALU 110 is able to access the relevant bits without resorting to accessing the same register bank 130, 160 twice, which would cause a delay as a result of one register bank outputting data stored in two registers from that bank. It is possible to only provide two register banks. This is achieved by interleaving the bits of each data element such that bits that will not be accessed in parallel are held in registers of the same register bank in the register file 40. Since each data element is 64 bits in length (i.e. b is 64) and since the integer ALU, when accessing a subset of the bits of each data element, accesses 32 bits (i.e. y is 32), only two register banks are required (b/y or 64/32 is 2). b and y are positive integer values.

Figure 3:
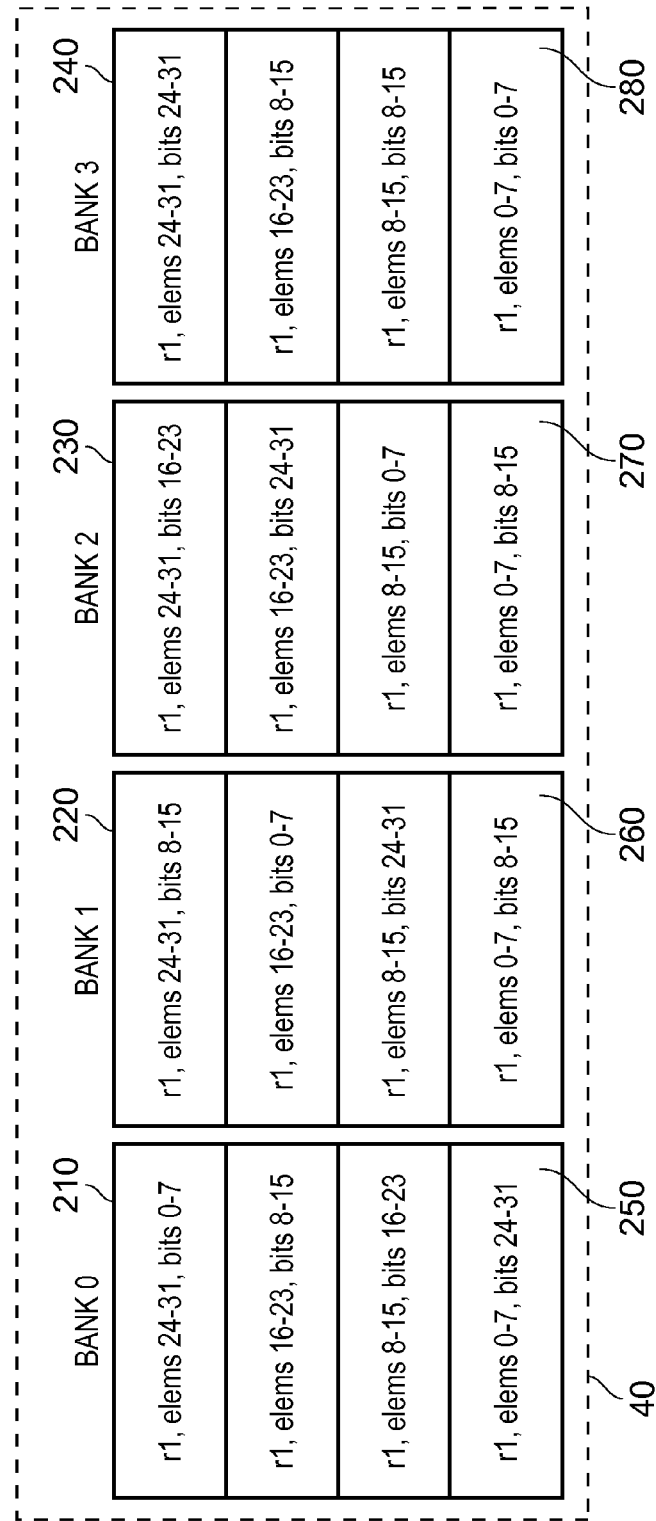
FIG. 3 shows an example of interleaving bits of data elements between four register banks in a register file.

FIG. 3 shows an example of interleaving across four register banks 210, 220, 230, and 240 in a register file 40. The interleaving follows a similar pattern to that of the register banks 130, and 160 shown in FIG. 2. However, in FIG. 3, each register within each register bank only stores 8 bits of 8 data elements. Integer ALU 110 (the second consumer) may continue to access the required bits as necessary without the need to perform multiple accesses on registers in the same register bank. For example, all 32 bits of elements 0 to 7 may be accessed by accessing the register 250 from bank zero 210, the register 260 from bank one 220, the register 270 from bank two 230, and the register 280 from bank three 240. It will be appreciated that integer ALU 110 may access different combinations of bits from the register banks 210, 220, 230, 240 in a similar manner to that discussed in relation to FIG. 2. The interleaving of bits is achieved by organising the bits of the data elements such that bits of the data elements that are not accessed in parallel by the consumers are stored in registers of the same register bank. Assuming that, in this example, the length of each data element is 32 bits (i.e. b is 32), and assuming that a consumer may access 8 bits of each data element at a time (i.e. y is 8), then four register banks are provided (b/y or 32/8 is 4).

Figure 4:
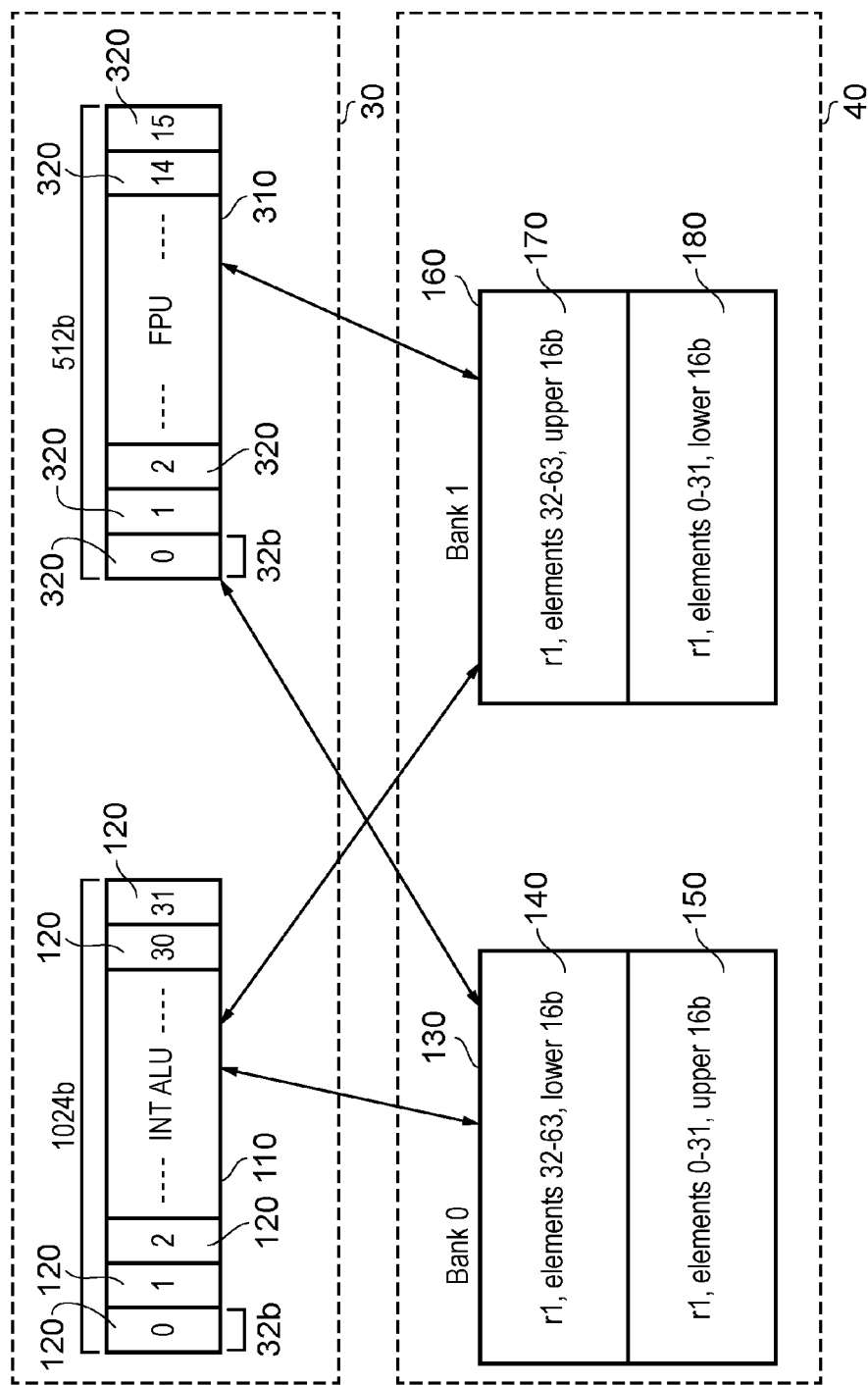
FIG. 4 shows an example in which two instances of instruction execution circuitry act as consumers and acquire data elements from a pair of register banks in a register file.

FIG. 4 shows an example in which a second consumer, floating point unit (FPU) 310, is provided. The FPU 310 has a width of 512 bits, which is smaller than that of the integer ALU 110. The FPU also comprises 16 lanes 320, each of 32 bits. The FPU 310 is also able to access the same register banks 130, 160 in the register file 40 as the integer ALU 110. However, it is assumed, in this example, that the register banks 130, 160 store 32 bit floating point data elements (i.e. z is 32) and that the FPU may access 16 bits of each data element at a time (i.e. c is 16). c and z are positive integer values.

Despite FPU 310 having a smaller width than the integer ALU 110, the arrangement of the register file 40 is not such that the FPU 310 must access one of the registers 140, 150, 170, and 180 and subsequently discard unwanted bits. An interleaving of bits is carried out in a similar manner to that described in relation to FIG. 2 with the exception that each register 140, 150, 170, and 180 stores 16 bits of each of 32 data elements.

By interleaving the data elements in this manner, FPU 310 does not need to access the same register bank 130, 160 more than once in order to access bits on which to perform a particular operation. Furthermore, there is no need for the FPU 310 to access a register bank 130, 160 and subsequently discard bits that cannot be handled at that time. Still furthermore, the integer ALU 110 may also access the same (floating point) data elements and perform an operation on those elements. This can also be achieved without the integer ALU 110 being required to access the same register bank 130, 160 more than once. For example, integer ALU 110 may perform an operation on all 32 bits of elements 0-31 by accessing the register 150 from bank zero and the register 180 from bank one. Accordingly, the interleaving leads to a data processing apparatus that is both flexible and efficient.

Figure 5:
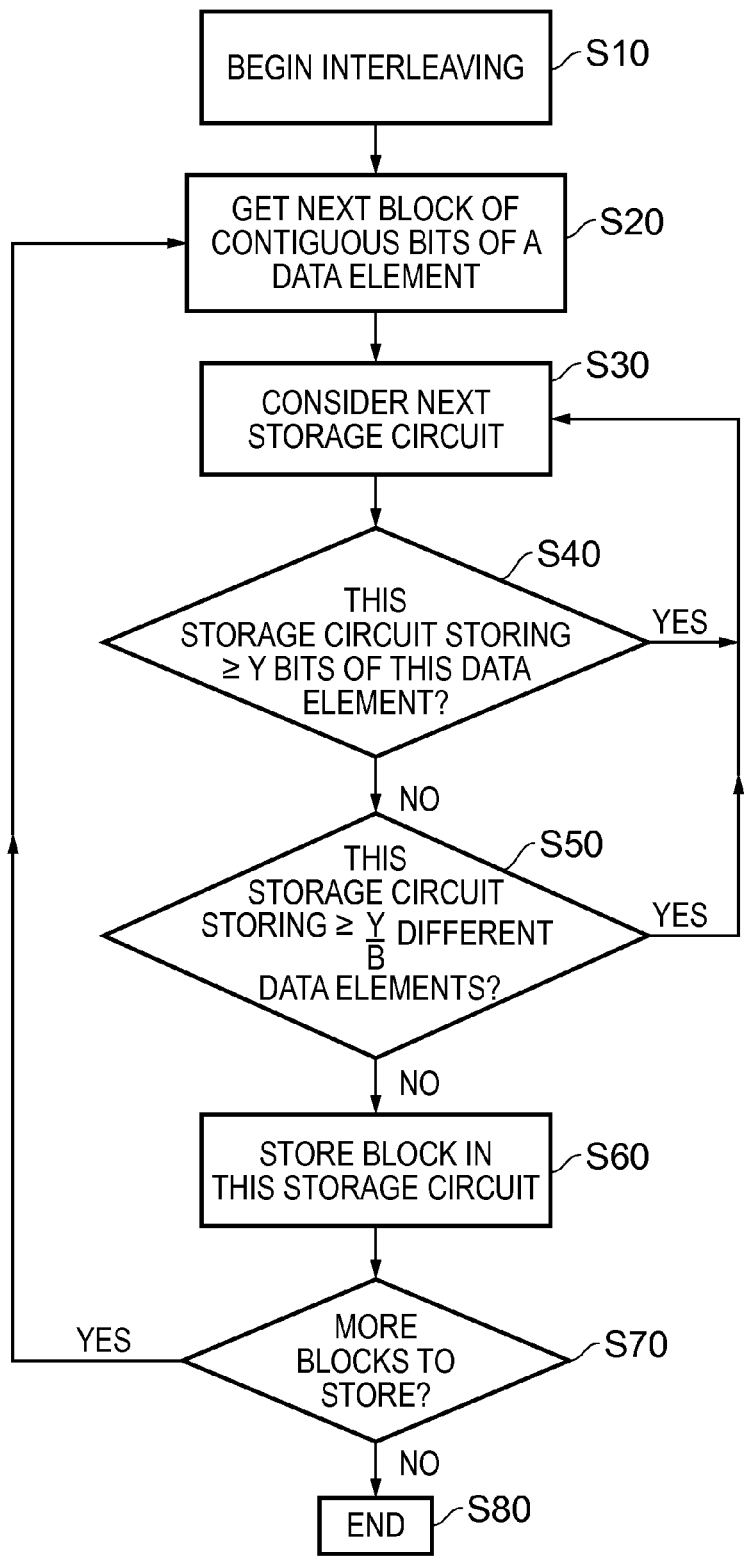
FIG. 5 is a flow chart showing an example method for interleaving bits between a plurality of storage circuits in accordance with one example embodiment.

FIG. 5 shows a method of interleaving or distributing the bits of data elements between a number of storage circuits such as register banks. The interleaving method begins at step S10. At step S20, the next block of contiguous bits of a particular data element are retrieved. At step S30, the next storage circuit is considered for storing this block of contiguous bits. Step S40 determines whether the storage circuit being considered is already storing y or more bits of this particular data element. If the storage circuit being considered does already store y or more bits of this data element, then the process returns to step S30 where the next storage circuit is considered. Alternatively, if the storage circuit does not already store y or more bits of the current data element then the process continues to step S50. At step S50, it is determined whether the storage circuit already stores y/b or more different data elements and, f so, the process returns to step S30 where the next storage circuit is considered. Alternatively, the process continues to step to S60. At step S60, it has been determined that the storage circuit being considered does not already store y or more bits of this data element and it has already been determined that the storage circuit does not store y/b or more different data elements. Accordingly, the storage circuit being considered is suitable for storing the current block of contiguous bits and so the storage assignment is made. The process then continues to S70. At step S70 it is determined whether or not there are more blocks of bits to be stored. If so, the process returns to step S20 where the next block of contiguous bits of the data element are retrieved, otherwise the process terminates at step S80. This process may be carried out for each data element. Accordingly, it can be seen how the bits of a set of data elements may be interleaved in accordance with the examples previously provided.

Although particular embodiments have been described herein, it will be appreciated that the invention is not limited thereto and that many modifications and additions thereto may be made in the scope of the invention. For example, various combinations of the features of the following dependent claims could be made with the features of the independent claims without departing from the scope of the present invention.

We claim:
1. A data processing device comprising:
a plurality of storage circuits configured to store a plurality of data elements of b bits in an interleaved manner; and
first instruction execution circuitry including a plurality of lanes, configured to be able to individually access each of said plurality of storage circuits and to receive into said plurality of lanes one of the set of (a) and (b):
(a) a subset of said plurality of data elements, and
(b) y bits of each of said plurality of data elements, and
wherein the first instruction execution circuitry is further configured to execute a common instruction on each of said plurality of lanes;
wherein b is greater than y and is an integer multiple of y;

wherein each of said plurality of storage circuits is configured to store a group of bits from each of said data elements, the group of bits comprising at most y bits, wherein the respective groups of bits stored in the same one of said storage circuits comprise at least one group of bits corresponding to a first subset of bit positions of a corresponding data element and at least one group of bits corresponding to a second subset of bit positions of a different corresponding data element, wherein the second subset of bit positions is different than the first subset of bit positions;

wherein each of said plurality of storage circuits is configured to store at most y/b of said plurality of data elements; and wherein said plurality of storage circuits comprise no more than b/y storage circuits.

2. A data processing device according to claim 1,
wherein said plurality of storage circuits is further configured to store a plurality of second data elements of c bits in an interleaved manner; and wherein said data processing device comprises second instruction execution circuitry configured to access in parallel a smaller number of bits than said first instruction execution circuitry, said second instruction execution circuitry including a plurality of second lanes and being configured to access a second subset of said plurality of storage circuits, to receive into said plurality of second lanes z bits of z/c of said plurality of second data elements from each storage circuit in said second subset, and to execute a common instruction on each of said plurality of second lanes.

3. A data processing device according to claim 2,
wherein said second subset consists of one of said plurality of storage circuits.

4. A data processing device according to claim 2,
wherein said second instruction execution circuitry is a floating point unit.

5. A data processing device according to claim 2,
wherein said first instruction execution circuitry is configured to access 1024 bits in parallel; and
wherein said second instruction execution circuitry is configured to access 512 bits in parallel.

6. A data processing device according to claim 1,
wherein said first instruction execution circuitry is an integer ALU.

7. A data processing device according to claim 1, wherein each of said plurality of storage circuits is configured to store a group of contiguous bits of each of said data elements.

8. A data processing device according to claim 1,
wherein said plurality of storage circuits comprise no more than 2 storage circuits.

9. A data processing device according to claim 1,
wherein b is 64.

10. A data processing device according to claim 1,
wherein y is 32.

11. A data processing device according to claim 1,
wherein each of said plurality of storage circuits is configured to store exactly y bits of each of said data elements.

12. A data processing device according to claim 1,
wherein each of said plurality of storage circuits is configured to store exactly y/b of said plurality of data elements.

13. A data processing device according to claim 1,
wherein said storage circuits are register groups.

14. A data storage method for storing a plurality of data elements of b bits in a plurality of storage circuits in an interleaved manner to be accessed by instruction execution circuitry, wherein said instruction execution circuitry includes a plurality of lanes and receives into said plurality of lanes one of the set of (a) and (b):
    (a) a subset of said plurality of data elements, and
    (b) y bits of each of said plurality of data elements, said method comprising:
    each of said plurality of storage circuits storing a group of bits of each of said data elements, the group of bits comprising at most y bits, wherein the respective groups of bits stored in the same one of said storage circuits comprise at least one group of bits corresponding to a first subset of bit positions of a corresponding data element and at least one group of bits corresponding to a second subset of bit positions of a different corresponding data element, wherein the second subset of bit positions is different than the first subset of bit positions;
    each of said plurality of storage circuits storing at most y/b of said plurality of data elements,
    wherein b is greater than y and is an integer multiple of y; and
    wherein said plurality of storage circuits comprise no more than b/y storage circuits.

15. A data processing device comprising: a plurality of storage means for storing a plurality of data elements of b bits in an interleaved manner; and
    an instruction execution means for individually accessing each of said plurality of storage means and for receiving into a plurality of lanes one of the set of (a) and (b):
    (a) a subset of said plurality of data elements and
    (b) y bits of each of said plurality of data elements,
    wherein the instruction execution means is configured to execute a common instruction on each of said plurality of lanes,
    wherein b is greater than y and is an integer multiple of y;
    wherein each of said plurality of storage means is configured to store a group of bits of each of said data elements, the group of bits comprising at most y bits, wherein the respective groups of bits stored in the same one of said storage circuits comprise at least one group of bits corresponding to a first subset of bit positions of a corresponding data element and at least one group of bits corresponding to a second subset of bit positions of a different corresponding data element, wherein the second subset of bit positions is different than the first subset of bit positions;
    wherein each of said plurality of storage means is configured to store at most y/b of said plurality of data elements; and
    wherein said plurality of storage means comprise no more than b/y storage means.

* * * * *